United States Patent Office 3,114,752
Patented Dec. 17, 1963

3,114,752
MONOMERIC ETHER-OLEFIN ADDUCTS AND THEIR PREPARATION
George G. Ecke, Pittsburgh, and Richard L. Jacobs, Murrysville, Pa., assignors to Koppers Company, Inc., a corporation of Delaware
No Drawing. Filed Mar. 8, 1962, Ser. No. 178,253
6 Claims. (Cl. 260—332.2)

This invention relates to the production of monomeric adducts by the reaction of cyclic ethers or thio ethers with an alpha, beta-unsaturated acid, acid ester or anhydride. In one specific aspect, it relates to the reaction of a tetrahydrofuran or a tetrahydrothiophene with maleic acid, maleic acid esters or maleic anhydride to provide monomeric 1:1 adducts.

It is well known that olefins react with acetals and ortho-formates to produce adducts. Such reactions are unique in that the alpha-carbon atom, where the reaction occurs, is activated by two and three ether groups, respectively. Adducts of this type are of limited utility because they are subject to extremely rapid hydrolysis of the acetal or ketal linkage within the molecule.

T. J. Wallace and R. J. Gritter, J. Org. Chem., 26, 283 (1961), reported the attempted addition of aliphatic cyclic ethers, such as tetrahydrofuran, to olefins, such as 1-octene. The ether ring was opened during the reaction and the resulting product was an acyclic ketone. U.S. Patent 2,811,512 describes the acid catalyzed reaction of tetrahydrofuran and maleic anhydride to form polyesters. Thus, heretofore, the attempted reaction of cyclic ethers with olefins has resulted in either ring opening to form a ketone or the polymerization of the ultimate product.

Unexpectedly, we have discovered that, in the presence of a free radical initiator, cyclic ethers and thio ethers react with maleic acid, its esters and anhydride, to give useful monomeric 1:1 adducts. These adducts, which are monomeric substituted succinic anhydrides, acids and esters, are liquid at room temperature or slightly elevated temperatures. Because of their low viscosity, the anhydrides and acids are remarkably effective in the curing of epoxy resins and the esters are excellent plasticizers for vinyl and other thermoplastic resins.

It is, therefore, an object of the invention to provide new monomeric substituted succinic anhydrides, acids and esters useful as plasticizers and curing agents for epoxy resins and a novel method of making such adducts.

In accordance with the invention, we have discovered novel adducts of the formula:

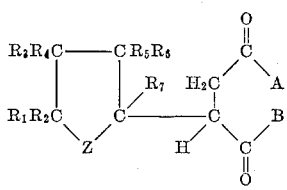

wherein $R_1$, $R_2$, $R_3$, $R_4$, $R_5$ and $R_6$ are hydrogen or lower alkyl; $R_7$ is hydrogen, lower alkyl, lower alkanolyoxymethylene, carboxy or carbo lower alkoxy; Z is oxygen or sulfur; and A and B, as individual substituents, are hydroxy or lower alkoxy and, collectively, represent an oxygen atom linked directly to the carbon atoms to which they are attached.

The adducts of the invention are made by reacting, in the presence of a catalytic amount of free radical initiator, a cyclic ether of the formula:

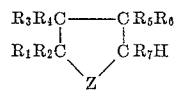

wherein $R_1$, $R_2$, $R_3$, $R_4$, $R_5$, $R_6$ and $R_7$ have the values given aforesaid with maleic acid, maleic anhydride or a lower alkyl diester of maleic acid at room temperature or above, but below the decomposition temperature of the reactants. The monomeric adduct is easily recovered from the reaction mixture by conventional methods, preferably by distillation.

The starting materials for making the adducts of the invention are readily available commercially. Useful cyclic ethers include, tetrahydrofuran, tetrahydrothiophene and substituted tetrahydrofurans and tetrahydrothiophene, such as tetrahydro-2-methylfuran, esters of tetrahydrofurfuryl alcohol, such as 2-tetrahydrofurfuryl acetate, and the like, 2,5-dimethyl tetrahydrofuran, 2,2,-di-methyl tetrahydrofuran, 2,2,5-trimethyl tetrahydrofuran, 2,5-dimethyl tetrahydrothiophene, 2,2-dimethyl tetrahydrothiophene, 2,2,5-trimethyl tetrahydrothiophene, 2-carboxy tetrahydrofuran and its esters. It is not necessary to use purified ethers as starting materials, although a pre-purification is often helpful in obtaining higher yields of the desired product. Sometimes there is sufficient free radical initiator present in impure furans to permit reaction without the addition of more catalyst. The preferred olefin for use in the reaction is maleic anhydride, although maleic acid and its lower alkyl esters, such as dimethyl maleate, diethylmaleate, di-n-butylmaleate, and the like, are also suitable.

The formation of the novel adduct is accomplished in the presence of any free radical initiator, including ultraviolet light and any compound which decomposes rapidly to produce free radicals within the temperature range of the reaction, viz: between room temperature and a temperature below the decomposition temperature of the reactants. Exemplary free radical initiators and the preferred temperature range for their use include: potassium persulfate (70-100° C.), benzoyl peroxide (50-95° C.), lauroyl peroxide (60-90° C.), t-butyl perbenzoate (100–115° C.), dicumyl peroxide, bis-p-chlorobenzoyl peroxide (80-95° C.), acetyl peroxide (25-90° C.), bis-2,4-dichlorobenzoyl peroxide (70-85° C.), bis -1(1-naphthoyl) peroxide (55-70° C.), cumene hydroperoxide (100-115° C.), 2-azo-bis(isobutyronitrile) (50-85° C.), t-butylhydroperoxide (95-110° C.), sodium perborate, sodium carbonate peroxide, di-t-butyl peroxide (110-200° C.), peracetate acid, sodium persulfate, sodium pyrophosphate peroxide and oxygen. The preferred initiators are azobisisobutyronitrile, ultraviolet light, tert-butyl peroxide and benzoyl peroxide.

The catalytic amount of free radical initiator, if a compound capable of releasing free radicals is used in the system, ranges between about 0.25–5 mole percent, based upon the number of moles of olefin. If less than about 0.25 percent is used, the reaction is very slow and if greater than about 5 percent is used, there is some danger of polymerizing the product or causing other undesirable side reactions. A preferred concentration of free radical initiator is about 1–1.5 mole percent. If ultraviolet light is used, any commercially available ultraviolet light, such as a G. E. Sunlamp, source can be utilized.

As noted hereabove, the reaction temperature ranges between room temperature and the decomposition temperature of the reactants. Generally speaking, any temperature between about 25° C. and 250° C. can be used without excessive decomposition. It is preferable from the standpoint of equipment cost to use a temperature at or below the boiling point of the reaction medium to avoid the use of superatmospheric pressure. For example, the reaction of tetrahydrofuran with maleic anhydride is conveniently effected at atmospheric pressure using a temperature between 25 and 66° C. The reaction also works well at higher temperatures, although in this case, a positive pressure greater than the vapor pressure of the reactants at the particular temperature is required.

Pressures up to 500 p.s.i. can be used for the reaction, although, from the standpoint of cost, it is obviously desirable to choose the conditions which would permit the use of the lowest possible pressure. If a positive pressure is used for the reaction, it is convenient to pressure the reaction zone up to the required pressure using an inert gas, such as nitrogen.

The choice of the mole ratio of ether to olefin is one of convenience rather than necessity. In order to provide the maximum yield of the 1:1 adduct, it is best to have present in the reaction mixture a slight excess of the cyclic ether.

Conveniently, the reaction is run using a substantial excess of ether as a solvent; e.g. from 5–15 moles of ether per mole of olefin. Alternatively, the reaction can be conducted using one mole of ether and one mole of olefin in an inert organic solvent in which both reactants are soluble. Suitable solvents include carbon tetrachloride, benzene, trichlorobenzene and tetrachlorobenzene.

The order of addition of the reactants is governed by practical considerations. If excess ether is used as the solvent, it is desirable to add the olefin to the ether. Simultaneous addition of olefin and ether is effective if an inert solvent is used as the reaction medium. In the absence of a solvent or a substantial excess of ether, it is particularly desirable to add the olefin to the ether to avoid undesirable side reactions.

The formation of the 1:1 adduct is generally complete in about 0.5–8 hours. The product is conveniently recovered by strip or vacuum distillation, although other conventional recovery techniques can be used. If the acid or anhydride is used as a starting material, the ester, if desired, can be made by adding a lower alkanol to the crude reaction mixture.

Our invention is further illustrated by the following examples:

*Example I*

A solution of 50 g. (0.51 mole) of maleic anhydride and 1.21 g. (0.005 mole) of benzoyl peroxide in 182 g. (2.53 moles) of tetrahydrofuran was heated at reflux under a nitrogen atmosphere for six hours. The product was distilled through a Claisen head to yield 151 g. (83% recovery) of tetrahydrofuran, 40.9 g. of crude (2-tetrahydrofuryl)succinic anhydride boiling at 109–130° at <1 mm. and 36.3 g. of residue. The distillate product had a neutral equivalent of 86–87 and the residue, 73.2. Redistillation of the product distillate gave a heart-cut boiling 85–88° at <1 mm. A sample of the heart-cut was sent for infrared spectrum and a portion used for analysis:

*Analysis.*—Calc'd. for $C_8H_{10}O_4$: C, 56.46; H, 5.92; neut. equiv., 85.1. Found: C, 56.84; neut. equiv., 86; H, 5.86.

The infrared spectrum was reported to exhibit absorptions characteristic of —$CH_2$—, cyclic (5 ring) anhydride, —$CH_2CO$—, tertiary CH, and cyclic (5 ring) ether consistent with the indicated structure for (2-tetrahydrofuryl)succinic anhydride.

*Example II*

A 500 ml. three-necked flask equipped with a sealed stirrer, thermometer and reflux condenser fitted with a nitrogen inlet was charged with 216.3 g. (3.0 moles) of tetrahydrofuran, 98.06 g. (1.0 mole) of maleic anhydride, and 2 g. (0.008 mole) of benzoyl peroxide. The resulting solution was heated at reflux (73° C.) under a nitrogen atmosphere for six hours. The reaction mixture was then subjected to a 1-plate distillation to yield 178.6 g. (82% recovery) of tetrahydrofuran, 49.41 g. (29% recovery) of (2-tetrahydrofuryl)succinic anhydride, B.P. 109.5°–135°/1 mm., 115°–120°/<1 mm., $n_D^{24.8}$ 1.4793, neut. equiv., 85.72 and 58.5 g. of an amber colored tar. In addition, small amounts of maleic anhydride and maleic acid were isolated. Near the end of the distillation period (pot temperature-190°) fumes were observed and an increase in pressure was noted.

This example, and the one that follows, illustrate the fact that, from the standpoint of yield, it is desirable to have sufficient excess ether present to serve as a solvent for the reaction.

*Example III*

A 1-liter three-necked flask provided with a sealed stirrer, thermometer, dropping funnel and reflux condenser fitted with a nitrogen inlet was charged with 182 g. (2.5 moles) of purified tetrahydrofuran, 1.21 g. (0.005 mole) of benzoyl peroxide and 10 g. (0.1 mole) of maleic anhydride. The reaction mixture was heated at reflux under nitrogen and a solution of 40 g. (0.4 mole) of maleic anhydride dissolved in 182 g. (2.5 moles) of purified tetrahydrofuran added dropwise over a 4.5 hour period. The resulting solution was held at reflux under nitrogen for an additional two hours and then distilled (1-plate) to yield 331.79 g. (92% recovery) of tetrahydrofuran, 54.3 g. (62.1%) of (2-tetrahydrofuryl)succinic anhydride and 24.4 g. of amber colored residue.

*Example IV*

A 1-liter three-necked flask provided with a sealed stirrer, thermometer and reflux condenser fitted with a nitrogen inlet was charged with 360.5 g. (5.0 moles) of purified tetrahydrofuran, 50 g. (0.51 mole) of maleic anhydride and 0.82 g. (0.005 mole) of azobisisobutyronitrile. The reaction mixture was heated at reflux under a nitrogen atmosphere for six hours. The product was distilled (1-plate) to yield 334.02 g. (95.7% recovery) of tertahydrofuran, 46.1 g. (54% yield) of (2-tetrahydrofuryl)succinic anhydride and 26 g. of amber colored residue.

*Example V*

A 1-liter three-necked flask equipped with a sealed stirrer, thermometer and variable take-off distillation head was charged with 360.5 g. (5.0 moles) of purified tetrahydrofuran and 50 g. (0.51 mole) of maleic anhydride. The reaction mixture was heated at reflux under a nitrogen atmosphere and irradiated with a G.E. sunlamp for six hours. The product was distilled (1-plate) to yield 328.7 g. (91% recovery) of tetrahydrofuran, 51.77 g. (60.84% yield) of (2-tetrahydrofuryl)succinic anhydride and 28.6 g. of an amber colored tar.

*Example VI*

To a 2-liter 316 stainless steel autoclave equipped with a Disperimax agitator (600 r.p.m.), thermocouple well, charging lines and port, dip leg, cooling coil, and 2000 p.s.i.g. blow-out disc was charged 721 g. (10 moles) of tetrahydrofuran, 98 g. (1.0 mole) of maleic anhydride and 7.3 g. (0.05 mole) of di-tert-butyl peroxide. The autoclave was sealed, pressured to 100 p.s.i.g. with nitrogen, heated to 150–155° (max. observed pressure 205 p.s.i.g.) and kept at this temperature for five hours. After cooling to room temperature overnight, the autoclave was vented and discharged. The crude reaction mixture was distilled (1-plate) to yield 675.6 g. (93.7% recovery) of tetrahydrofuran, 71.1 g. (42% yield) of (2-tetrahydrofuryl)succinic anhydride; neutral equivalent found=86.4, calc'd.=85.1; B.P. 140–160°/1–2 mm.; $n_D^{25.5}$ 1.4790. The infrared spectrum was identical to that of (2-tetrahydrofuryl)succinic anhydride prepared using benzoyl peroxide and ultraviolet light catalyzed reaction of maleic anhydride with tetrahydrofuran. 76.3 g. of telomeric residue was also produced in this reaction.

*Example VII*

The procedure of Example VI was repeated using a reaction temperature of 115–120° and a reaction time of 7 hours. Distillation of the reaction product afforded 654.4 g. (91% recovery) of tetrahydrofuran, 77.5 g.

(45.5% yield) of (2-tetrahydrofuryl)succinic anhydride, $n_D^{26}$ 1.4788; B.P. 148–167°/1.3 mm., B.P. 105–110°/0.1 mm., neut. equiv. found 85.5, calc'd. 85.1 and 73.2 g. of telomeric residue.

Example VIII

A 1-liter three-necked equipped with stirrer, thermometer, and reflux condenser fitted with a nitrogen inlet was charged with 305 g. (4.2 moles) of tetrahydrofuran, 83.1 g. (0.4 mole) of diethyl maleate, and 1.21 g. (0.005 mole) of benzoyl peroxide. The resulting solution was heated to 68–70° C. and held at this temperature for seven hours. At the end of three hours, an additional 1.14 g. of benzoyl peroxide was added to the reaction mixture. The resulting solution was distilled to yield 280 g. (92% recovery) of tetrahydrofuran, 47.6 g. (57.3% recovery) of diethyl maleate and 28.1 g. of product boiling at 122–131° C./1–2 mm., $n_D^{24.5}$ 1.4511, sapon. eq. calc'd for 1:1 adduct, 122.1; found 122.4. The latter material was examined by infrared procedures and reported to exhibit absorptions characteristic of alkyl CH, C—CH₃, saturated ester and five-membered ring ether groups.

The infrared data is consistent with the proposed structure for the 1:1 adduct of tetrahydrofuran and diethyl maleate

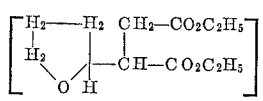

An 18.7 g. high boiling residue was also obtained from the above reaction.

Example IX

A solution of 49 g. (0.5 mole) of maleic anhydride and 1.21 g. (0.005 mole) of benzoyl peroxide in 430 g. (5.0 moles) of tetrahydro-2-methylfuran was held at 75–80° for five hours under a nitrogen atmosphere. The reaction mixture was then distilled (1-plate) to yield 390.2 g. (90.7% recovery) of tetrahydro-2-methylfuran, 65.3 g. (70% recovery) of 1:1 adduct, B.P. 121–152°/1 mm., neut. equiv. calc'd: 92.1. Found: 92.8, plus 23.6 g. of dark red non-volatile glass. The 1:1 adduct was redistilled through a 24 cm. column packed with ⅜ inch glass helices, to yield a heart cut boiling at 150–151°/6 mm., 106–107°/1 mm., $n_D^{23}$ 1.4761. Analysis.—Calc'd for $C_9H_{12}O_4$: C, 58.67; H, 6.57; neut. equiv., 92.1. Found: C, 58.76; H, 6.69; neut. equiv., 92.3. A sample of this material was examined by both infrared procedures and by nuclear magnetic resonance procedures. According to the infrared report, the product exhibits absorptions characteristic of a five-membered cyclic anhydride, $CH_2$—C=O, and C—CH₃ group, consistent with the proposed structure for (2-tetrahydro-2-methylfuryl)succinic anhydride. According to the nuclear magnetic resonance report, the product had the following structure:

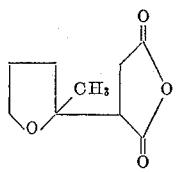

Example X

The procedure of Example VI was repeated, employing a 10:1 molar ratio of (2-tetrahydrofurfuryl)acetate to maleic anhydride and 0.05 mole of di-tert-butyl peroxide as the free radical initiator. Subsequent distillation of the reaction mixture afforded recovered starting material plus a viscous dark brown residue, containing the desired product:

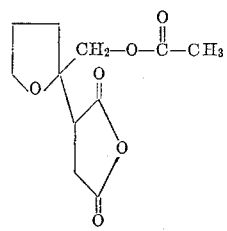

Example XI

The procedure of Example VI was repeated, employing 10:1 molar ratio of the ethyl ester of 2-tetrahydrofuran carboxylic acid to maleic anhydride and 0.05 mole of di-t-butyl peroxide as the free radical initiator. Subsequent distillation of the reaction mixture afforded recovered starting material plus a viscous residue containing the desired product, indicating that the reaction proceeded according to the following equation:

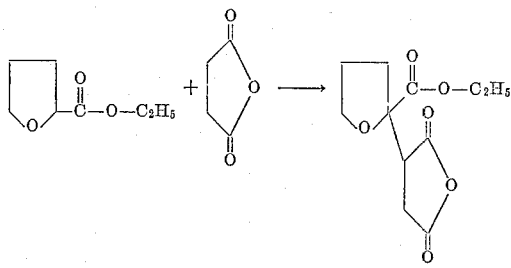

Example XII

The procedure of Example XI was repeated using 2-tetrahydrofuran carboxylic acid as the starting material. Similar results were obtained.

Example XIII

A solution of 24.5 g. (0.25 mole) of maleic anhydride and 0.5 g. (0.003 mole) of azobisisobutyronitrile in 200 g. (2.5 moles) of dry tetrahydrothiophene was held at 70–73° for five hours under a nitrogen atmosphere. The reaction mixture was then distilled (1-plate) at reduced pressures to yield 210.8 g. (96% recovery) of tetrahydrothiophene; 10 g. (41% recovery) of maleic anhydride; 14.2 g. (30.6% conversion) of orange distillate, B.P. 132–168°/(<1 mm., identified as the 1:1 adduct. Analysis.—Calc'd for $C_8H_{10}O_3S$: S, 17.18; neut. equiv., 93. Found: S, 16.93; neut. equiv., 94.4. The reaction mixture also afforded 7.2 g. of non-volatile tarry residue.

Example XIV

A solution of 66.3 g. (0.5 mole) of chloromaleic anhydride and 2.42 g. (0.01 mole) of benzoyl peroxide in 360.5 g. (5.0 moles) of tetrahydrofuran was held at reflux (68° C.) for five hours under a nitrogen atmosphere. The reaction mixture was distilled (1-plate) to yield 355.5 g. (98.6% recovery) of tetrahydrofuran, 59.6 g. (90% recovery) of chloromaleic anhydride, 2 g. of benzoic acid, 4.6 g. of distillate, B.P. 128–145°/2–3 mm. and 3 g. of tarry residue. The distillate, B.P. 128–145°/2–3 mm., was examined by infrared procedures and reported to exhibit absorptions characteristic of alkyl CH, (—CH₂), five-membered ring of cyclic anhydride, C=C, carboxylic acid, $CH_2$—C=O and five-membered ring cyclic ether. This would suggest that only a trace amount of the desired 1:1 adduct was produced in the reaction.

Example XV

A solution of 28 g. (0.25 mole) of citraconic anhydride and 0.6 g. (0.0025 mole) of benzoyl peroxide in 180 g. (2.5 moles) of tetrahydrofuran was held at reflux (67°) under a nitrogen atmosphere for seven hours. At the end of two hours, an additional 0.6 g. (0.0025 mole) of benzoyl peroxide was added to the reaction to the reaction mixture. The product was distilled (1-plate) to yield 176.2 g. (98% recovery) of tetrahydrofuran, 24.4 g. (87% recovery) of citraconic anhydride, and 3.1 g. of high boiling residue.

*Example XVI*

A 500 ml. three-necked flask equipped with stirrer, thermometer, and reflux condenser provided with a nitrogen inlet was charged with 240.3 g. (2.0 moles) of styrene oxide, 19.6 g. (0.2 mole) of maleic anhydride and 0.24 g. (0.001 mole) of benzoyl peroxide. The resulting mixture was heated to 68° C. and held at this temperature for seven hours. At the end of three hours and five hours, additional 0.24 g. (0.001 mole) quantities of benzoyl peroxide were added to the reaction mixture. The resulting solution was distilled to yield 243.5 g. of material (mixture of styrene oxide and maleic anhydride) boiling at 70–72° C./10 mm. Continued distillation afforded 2.5 g. of solid (B.P. 109–160° C.) which was recrystallized from ether, M.P. 166–168° C. and a 14.8 g. residue.

The residue was examined by infrared procedures and reported to be polymeric styrene oxide.

Similar results were obtained when ultraviolet light was used as the free radical initiator. In this reaction 18 g. (8% yield) of polymeric styrene oxide were produced and 2 g. of unknown solid melting at 166–168° C.

*Example XVII*

A 500 ml. three-necked flask equipped with a sealed stirrer, thermometer and reflux condenser fitted with a nitrogen inlet was charged with 370.6 g. (5.0 moles) of anhydrous diethyl ether, and 50 g. (0.51 mole) of maleic anhydride. The reaction mixture was heated to reflux and irradiated with a G.E. sunlamp for seven hours. Removal of the excess ether left a viscous orange colored oil which was subjected to a 1-plate distillation under reduced pressure. A total of 19.7 g. (39.4% recovery) of maleic anhydride was recovered unchanged. In addition 5.4 g. of liquid product, B.P. 101–120/1 mm. was obtained and 31.5 g. of amber colored tar. A sample of the distillate was examined by infrared procedures and reported to exhibit absorptions characteristic of a 5-membered ring cyclic anhydride, alkyl CH, $CH_2$—CO, and C—O—C groups consistent with the proposed structure of 2-(alpha-ethoxyethyl)succinic anhydride.

*Analysis.*—Calc'd for $C_8H_{12}O_4$: C, 55.0; H, 7.2; neut. equiv., 86.1. Found: C, 54.4; H, 6.3; neut. equiv., 85.8.

The infrared spectrum of the amber colored residue was reported to exhibit absorptions characteristic of a 5-membered ring cyclic anhydride and $CH_2$—CO. This sample exhibited no absorptions characteristic of the C—O—C group.

*Example XVIII*

A 1-liter three-necked flask equipped with sealed stirrer, reflux condenser provided with a nitrogen inlet, thermometer and dropping funnel was charged with 220 g. (2.5 moles) of purified 1,4-dioxane (purified as described in L. F. Fieser in "Experiments in Organic Chemistry," p. 285, 1955). The dioxane was heated to reflux and 0.73 g. (0.005 mole) of di-tert-butyl peroxide added in one portion. To the dropping funnel was added a solution composed of 49 g. (0.5 mole) of maleic anhydride dissolved in 220.2 g. (2.5 moles) of 1,4-dioxane. The maleic anhydride-dioxane solution was then added dropwise over a five hour period to the refluxing dioxane-di-tert-butyl peroxide solution. The resulting mixture was refluxed for an additional three hours and set aside overnight. Distillation (1-plate) of the reaction mixture afforded only starting materials plus 8.5 g. of dark brown, viscous tar.

*Example XIX*

A solution of 49 g. (0.5 mole) of maleic anhydride and 1.21 g. (0.005 mole) of benzoyl peroxide in 430 g. (5.0 moles) of tetrahydropyran (distilled from the mono- and disodium adducts of benzophenone) was heated at 69–71° for six hours under a nitrogen atmosphere. The product was distilled to yield 401 g. (93.2% recovery) of tetrahydropyran, 19 g. (40% recovery) of maleic anhydride and 50.6 g. of red-orange glass. Then 9.5 g. of reaction product were lost in the initial transfer of the product from the reaction flask to a 1-liter distilling flask.

We have thus provided a novel class of compounds particularly useful as plasticizers and curing agents for epoxy resins. Effective curing of, for example, epoxidized o-cresol novolak resin, is accomplished by adding one of our novel acids or anhydrides in an amount corresponding to 1–3 active hydrogen equivalents per oxirane group of the epoxy resin. The exact amount of curing agent used depends upon the efficiency of the mixing of the agents with the epoxy resin. Since our novel products are liquid at room temperature and have a low viscosity, they are easily mixed and sufficient curing can be achieved with the minimum amount of curing agent.

Our new esters are exceptional plasticizers for virtually every type of thermoplastic resin requiring plasticization. Thus, the new adducts serve as useful plasticizers when admixed in an amount ranging about between 10–120% by weight, based on the weight of resin, with vinyl polymers such as polyvinylchloride, chlorinated polyethylene or polypropylene, polyvinyl butyral, polyvinyl acetate, co-polymers of vinylacetate and vinylchloride; vinyl aromatics such as styrene, alphamethyl styrene and the like; cellulosic resins such as nitrocellulose, cellulose acetate, ethyl cellulose, mixed cellulose esters, e.g. cellulose acetate propionate and the like; synthetic rubbers, such as styrene-butadiene co-polymers and styrene-acrylonitrile co-polymers, chlorinated rubber; vinylidenechloride-acrylonitrile co-polymers, natural resins and gums, and certain acrylates.

The formation of our novel monomeric adducts using a free radical initiator is quite surprising in view of the fact that attempts to form such adducts in substantial amounts using ethyl ether, tetrahydropyran, styrene oxide and 1,4-dioxane were unsuccessful as is shown in comparative Examples XVI, XVII, XVIII and XIX. The fact that successful reaction occurs only with maleic acid, its anhydride or esters is shown by the attempted adduct preparation using chloromaleic anhydride (Example XIV) and citraconic anhydride (Example XV).

We claim:

1. A compound of the formula:

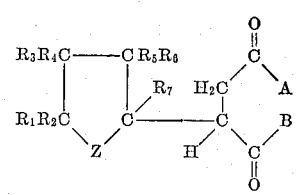

wherein $R_1$, $R_2$, $R_3$, $R_4$, $R_5$, and $R_6$ are members selected from the group consisting of hydrogen and lower alkyl, $R_7$ is a member selected from the group consisting of hydrogen, lower alkyl, lower alkanoyloxymethylene, carboxy and carbo lower alkoxy, Z is a member selected from the group consisting of oxygen and sulfur and A and B, as individual substituents are members selected from the group consisting of hydroxy and lower alkoxy, and, collectively, represent an oxygen atom linked directly to the carbon atoms to which they are attached.

2. (2-tetrahydrofuryl)succinic anhydride.
3. (2-tetrahydro-2-methylfuryl)succinic anhydride.
4. (2-tetrahydrothienyl)succinic anhydride.

5. Diethyl-(2-tetrahydrofuryl)succinate.
6. 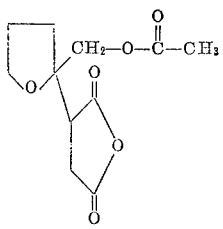
References Cited in the file of this patent
UNITED STATES PATENTS
| | | | |
|---|---|---|---|
| 2,121,183 | Binapfl | | June 21, 1938 |
| 2,692,270 | Beavers | | Oct. 19, 1954 |
| 3,030,387 | Benoit | | Apr. 17, 1962 |
OTHER REFERENCES
Bickford et al.: Jour. Oil Chemists Soc., vol. 25 (1948), pp. 251–7.
Shechter et al.: Jour. Org. Chem., vol. 21 (1956), pp. 1473–76.
Reicheneder et al.: 1,008,744, May 23, 1957 (German Auslegeschrift) (Kl. 12q 24), 2 pages.